J. T. WILKIN.
PROPORTIONAL GOVERNOR.
APPLICATION FILED APR. 24, 1916.

1,341,696.

Patented June 1, 1920.
2 SHEETS—SHEET 1.

WITNESSES:
Frank A. Kohle
Josephine Gasper

INVENTOR
John T. Wilkin,
BY
Hood & Schley
ATTORNEYS

J. T. WILKIN.
PROPORTIONAL GOVERNOR.
APPLICATION FILED APR. 24, 1916.

1,341,696.

Patented June 1, 1920.
2 SHEETS—SHEET 2.

WITNESSES:
Frank A. Fahle
Josephine Gasper

INVENTOR
John T. Wilkin,
BY
Hood & Schley.
ATTORNEYS

UNITED STATES PATENT OFFICE.

JOHN T. WILKIN, OF CONNERSVILLE, INDIANA, ASSIGNOR TO THE CONNERSVILLE BLOWER COMPANY, OF CONNERSVILLE, INDIANA, A CORPORATION OF INDIANA.

PROPORTIONAL GOVERNOR.

1,341,696.

Specification of Letters Patent.

Patented June 1, 1920.

Application filed April 24, 1916. Serial No. 93,284.

*To all whom it may concern:*

Be it known that I, JOHN T. WILKIN, a citizen of the United States, residing at Connersville, in the county of Fayette and State of Indiana, have invented a new and useful Proportional Governor, of which the following is a specification.

In the manufacture of coke and gas from coal, it is necessary that the pressure condition in the oven offtake main be maintained constant within exceedingly close limits, in order to produce the best results, and it is the object of my present invention to provide a regulator which will automatically do this with precision and positiveness, and will act with a force and speed substantially proportional to the error to be corrected.

I obtain this result by controlling the speed of the exhauster for the offtake main, and do so by a device operated by liquid under pressure, so that it will have absolute exactness of movement because of the incompressibility of the liquid, and control the supply of liquid to the device by pressure-responsive means connected so as to be responsive to the pressure in the oven offtake main, preferably close to the ovens.

Figure 1:
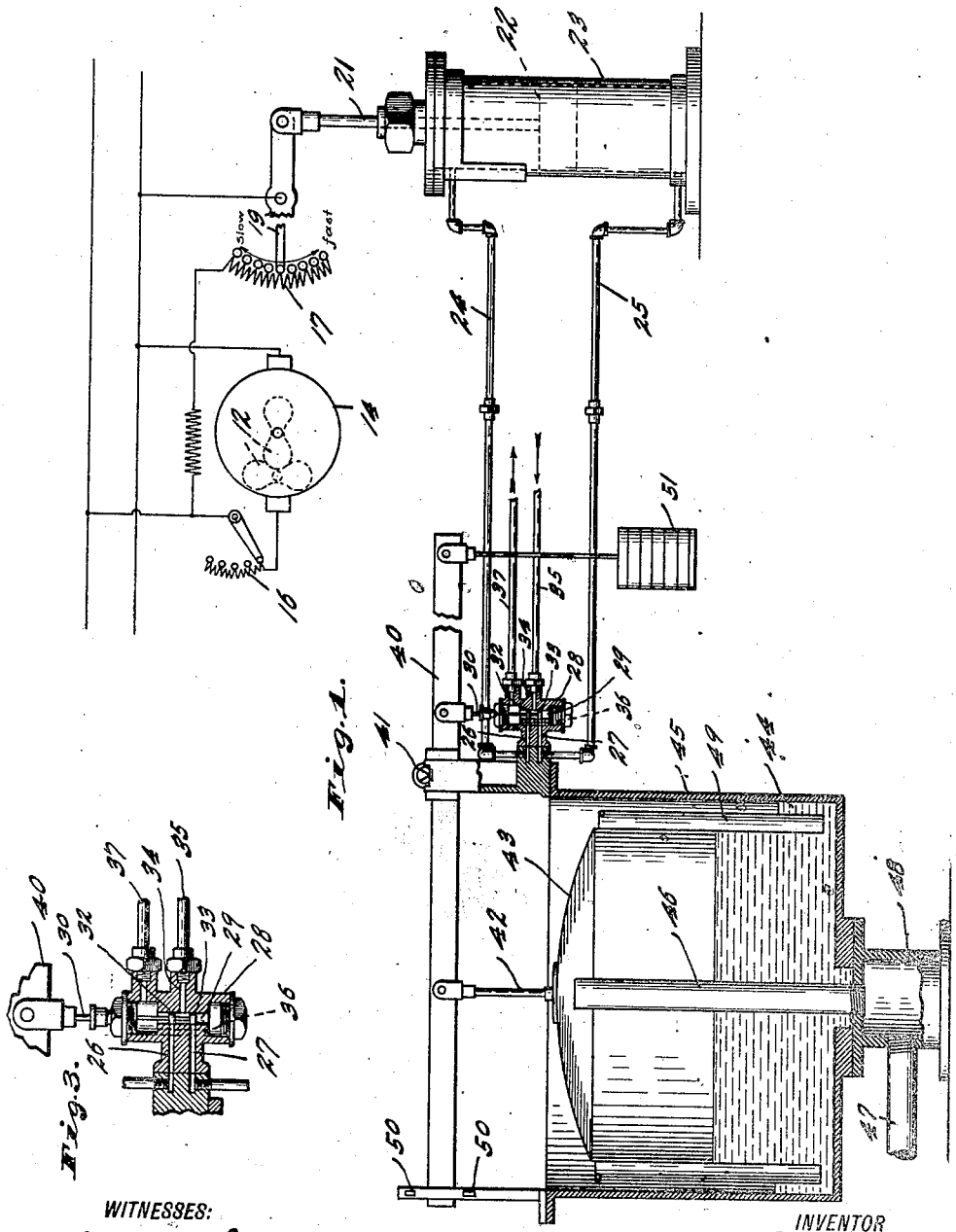
Figure 2:
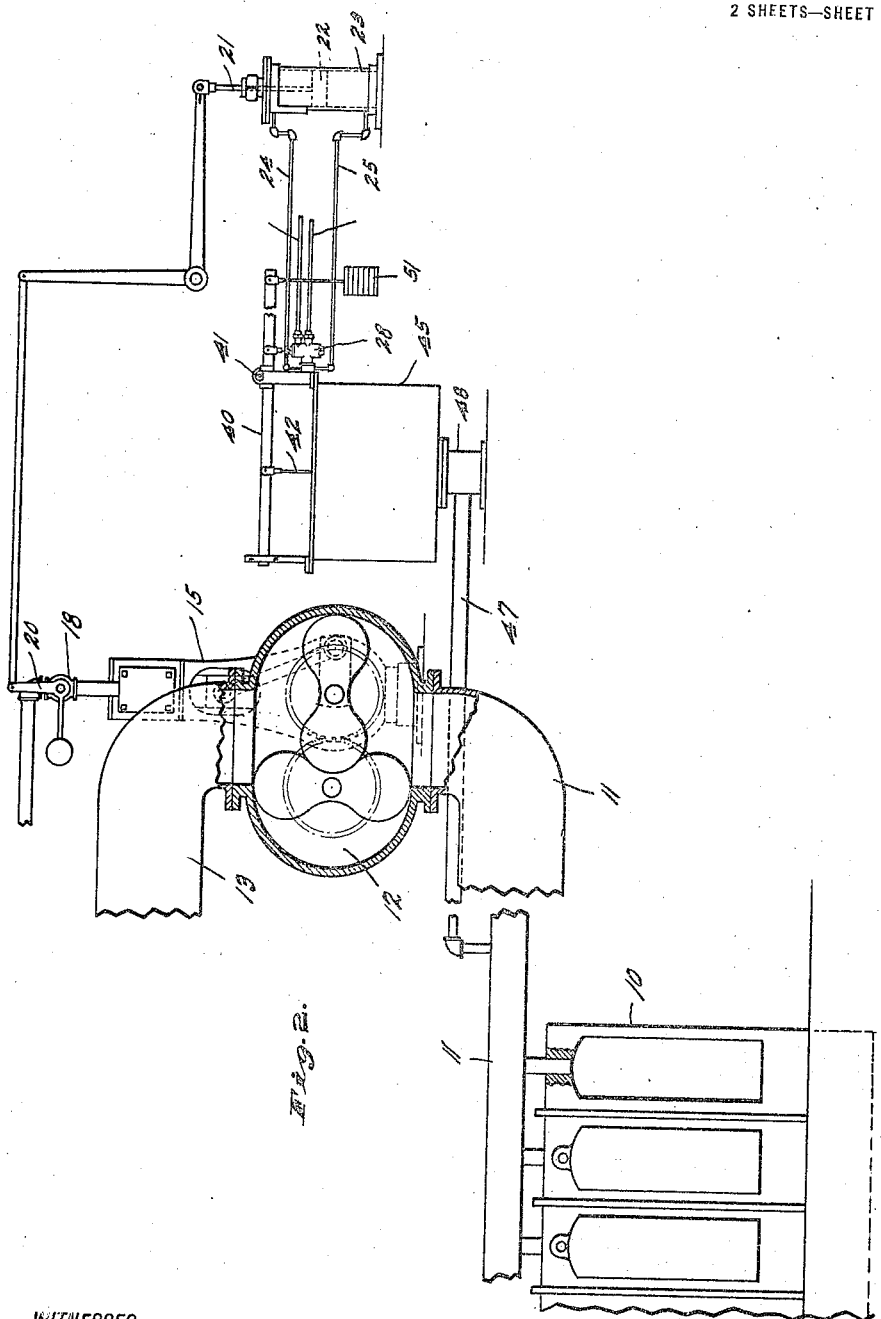

The accompanying drawing illustrates my invention. Figure 1 is a diagrammatic view showing the structure of my pressure-regulating device and its connections for controlling the electric motor operating the exhauster; Fig. 2 is a diagrammatic view showing the connections of the exhauster to the offtake main from the ovens, and my regulating device controlling a steam engine operating such exhauster; and Fig. 3 is an enlarged detail view of the control valve.

The gas from the coke ovens 10 is discharged therefrom into the oven offtake main 11, and is carried along such main to the intake of the exhauster 12, which is operated to maintain the desired pressure condition in the offtake main 11 and to force the gas on through the discharge main 13 for further treatment and storage. The exhauster 12 is indicated as of the lobed impeller type, and may be operated by any suitable source of power, such as the electric motor 14 shown in Fig. 1 or the steam engine 15 shown in Fig. 2. The electric motor 14 is shown as a direct current motor, having a starting rheostat 16 and a field rheostat 17, the adjustment of the latter controlling the motor speed. The steam engine 15 is shown as provided with the usual throttle valve 18.

The arm 19 of the rheostat 17 or arm 20 of the throttle valve 18 is moved in a clockwise direction to decrease the speed and in a counterclockwise direction to increase the speed of the exhauster 12. To obtain this movement, such arm 19 or 20 is suitably connected to the piston rod 21 of a piston 22 mounted in a cylinder 23, upward movement of the piston 22 causing an increase in the speed of the exhauster and downward movement causing a decrease in such speed. The piston 22 is operated by liquid pressure, such as water from the city mains. For this purpose, the two ends of the cylinder 23 are connected by pipes 24 and 25 to the two control ports 26 and 27 of a control valve 28, the two ports 26 and 27 communicating with a central passage 29 in which is mounted a sliding valve stem having two spaced collars 32 and 33 fitting closely within the passage 29 and controlling the ports 26 and 27 respectively. In the neutral position of the valve stem, both ports 26 and 27 are covered, but on a slight movement of the valve stem 30 upward or downward the ports 26 and 27 are uncovered just below or just above their respective controlling collars 32 and 33, the amount of such uncovering varying with the extent of movement of the valve stem 30. The central passage 29 is provided between the two collars 32 and 33 with a supply port 34, which is connected by a pipe 35 to any suitable source of liquid pressure, such as the city water mains; and the two ends of the passage 29 beyond the collars 32 and 33 communicate with interconnected exhaust chambers 36 communicating with the exhaust pipe 37 for carrying off the used water.

The valve stem 30 is pivotally connected to a lever 40 having a knife edge support 41, and pivotally connected to this lever 40 is the upwardly projecting stem 42 from a bell 43 the depending sides of which project below the surface of the water 44 in a water-containing chamber 45. A pipe 46 projects upward from the bottom of the chamber 45 under the bell 43 to a greater height than the maximum water level under such bell, the upper end of the pipe 46 thus communicating with the space within the bell 43 above the water level under such bell. The lower end of the pipe 46 is connected by a pipe 47 to the oven offtake main 11, preferably close to the intake of the ovens 10, this connection being shown as being by way of the hollow supporting base 48 for the water-containing chamber 45. Thus the pressure under the bell 43 corresponds to that in the offtake main 11, while the pressure on the outside of the bell 43 is that of the atmosphere. The bell 43 is provided with a buoyancy chamber 49, which is shown as being formed by making the wall of the bell double to provide an annular chamber, from which the water from the chamber 45 is excluded. This buoyancy chamber may be made in different ways, but is shown as being closed at the bottom and open at the top so that it contains air at atmospheric pressure. The depth of immersion of the buoyancy chamber 49 varies with the rise and fall of the bell 43, so that its lifting force on the bell likewise varies, decreasing as the bell rises and increasing as the bell falls. This buoyancy chamber serves to limit the vertical movement of the bell for a change in pressure in the offtake main 11, the length of such motion for a given change in such pressure being dependent upon the relation between the cross sectional area of the buoyancy chamber 49 and the cross sectional area of the interior of the bell 43. The vertical movement of the bell 43 is transmitted to the lever 40, and thence to the valve stem 30, and the movement of the lever 40 may be limited by two adjustably fixed blocks 50 above and below the end of the lever 40. The lever 40 is properly counterbalanced, by an adjustable weight 51, so that the valve stem 30 is in its middle or neutral position when for a given water level in the chamber 45 the pressure in the offtake main 11 is the desired normal.

In operation, for such desired normal pressure in the offtake main 11 and on the intake side of the exhauster 12, the valve stem 30 is in its neutral position, so that no water is supplied to either end of the cylinder 23 and the rheostat 19 or valve-operating arm 20 is stationary. The motor 14 or steam engine 15, under such conditions, operates the exhauster 12 at a constant speed. If for any reason the pressure in the offtake main 11 rises, the increase of pressure is transmitted to the space beneath the bell 43, causing such bell to rise until the effect of such increase in pressure on the bell is counter-balanced by the decrease in the buoyant action of the buoyancy chamber 49. This rise of the bell 43 is transmitted through the lever 40 to the valve stem 30, to move the latter downward. This uncovers the control ports 26 and 27 of the control valve 28, a greater or less extent depending upon the change in pressure in the offtake main 11 and the resultant movement of the bell 43, connecting the port 27 to the supply port 34 and the port 26 to the exhaust chamber 36. This permits water from the pipe 35 to be supplied through the ports 34 and 27 to the pipe 25 and thence to the lower end of the cylinder 23 below the piston 22, so that the pressure of such water will force the piston 22 upward, the water above the piston 22 in the cylinder 23 being allowed to escape through the pipe 24, port 26, exhaust chamber 35, and exhaust pipe 37. The upward movement of the piston 22 moves the rheostat arm 19 or the throttle valve 18 to produce an increase in the speed of the motor 14 or steam engine 15 and so in the exhauster 12, so as to cause an increase in the exhausting action of the exhauster 12 from the offtake main 11. By reason of this increased exhaustive action, the pressure in the offtake main 10 is reduced slightly, allowing the bell 43 to drop to reduce and finally stop the supply of water to the lower end of the cylinder 23, and thus gradually slow down and finally stop the movement of the rheostat arm 19 beyond the throttle valve 18. If the pressure in the offtake main 11 falls below the normal, the bell 43 is pushed down by the atmospheric pressure until the effect of the decrease in the pressure in the main 11 on the bell 43 is counterbalanced by the increased buoyant effect of the buoyancy chamber 49. This movement of the bell 43 is transmitted through the lever 40 to the valve stem 30 to raise the latter, so as to connect the ports 26 and 34 and to connect the port 27 with the discharge chamber 36. This admits the water pressure from the pipe 35 to the pipe 24 and thence to the upper end of the cylinder 23, where it acts on the piston 22 to force the latter downward, the water below such piston being allowed to escape by the pipe 25, the port 27, the exhaust chamber 36, and the exhaust pipe 37. The downward movement of the piston 22 moves the rheostat arm 19 or the throttle valve 18 to decrease the speed of the motor 14 or steam engine 15 and so the speed of the exhauster 12, so as to reduce the exhausting action on the offtake main 11 and cause an increase in the pressure in such offtake main. As such pressure increases the bell 43 is moved upward toward and finally to normal, thus gradually returning the valve stem 30 also to normal to shut off the supply of water pressure to the upper end of the cylinder 23 and so to slow down and finally stop the speed-decreasing movement of the rheostat arm 19 or throttle valve 18.

The bell 43 moves up and down so as to follow closely the minutest variations in the pressure at the entrance to the exhauster 12. The extent of opening of the ports 26 and 27, and therefore the speed of the movement of the piston 22, varies with the extent of movement of the bell 43 from normal, so as to produce a speed-changing movement of the rheostat arm 19 or throttle valve 18 at a speed proportionate to the departure from normal of the pressure in the offtake main 11. However, the size of the ports 26 and 27 is relatively small, because of the inertia of the moving parts of the exhauster 12 and its driving motor or steam engine, so that the movements of the rheostat arm 19 or steam valve 18 may be relatively dead-beat and over-regulation is avoided. The actual size given the ports 26 and 27 in practice thus depends on the rapidity with which the exhauster 12 and its connected moving parts can change in speed; but the speed-changing movement of the rheostat arm 19 or throttle valve 18 is itself at a speed proportional to the variation in the controlling pressure which it is desired to maintain normal. In the present description and illustration of my invention, I have contemplated pressures which are very close to atmospheric pressure, so that the bell 43 and its counterweight 51 and their associated parts may be relatively light, and therefore of relatively small inertia, so that the dead-beat action referred to is obtained and over-regulation is avoided without the necessity for any retarding device in addition to the friction of the parts. However, this does not exclude the use of such an additional retarding device, such as a dash pot, which would be obviously applied in any suitable form to obtain the dead-beat action and avoid over-regulation when by reason of the use of pressures farther from atmospheric pressure the inertia of these parts is greater, because of the increase in the counter-balancing weight 51 required by the greater difference in liquid level within and without the bell 43.

I claim as my invention:

1. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to either end of said cylinder and permitting the escape of said liquid from the other end of said cylinder, a bell dipping into a liquid and operating said control valve, and a connection from an inclosed space vertically on one side of said bell to the offtake main, so that the pressure in such space corresponds to that of the intake side of the exhauster.

2. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, and a connection from an inclosed space vertically on one side of said bell to the offtake main, so that the pressure in such space corresponds to that of the intake side of the exhauster, said bell being provided with a variably immersed buoyancy chamber whereby the buoyancy of the liquid on the bell is increased with the depth of immersion.

3. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to either end of said cylinder and permitting the escape of said liquid from the other end of said cylinder, a bell dipping into a liquid and operating said control valve, and a connection from an inclosed space vertically on one side of said bell to the offtake main, so that the pressure in such space corresponds to that of the intake side of the exhauster.

4. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, and a connection from an inclosed space vertically on one side of said bell to the offtake main, so that the pressure in such space corresponds to that of the intake side of the exhauster.

5. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, and a connection from an inclosed space vertically on one side of said bell to the offtake main, so that the pressure in such space corresponds to that of the intake side of the exhauster, the space vertically on the other side of said bell being under atmospheric pressure.

6. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, a connection from an inclosed space vertically on one side of said bell to the offtake main, so that the pressure in such space corresponds to that of the intake side of the exhauster, and means for producing on said bell a vertically acting force varying with the vertical position of said bell.

7. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, a connection from an inclosed space vertically on one side of said bell to the offtake main, so that the pressure in such space corresponds to that of the intake side of the exhauster, said bell being provided with a variably immersed buoyancy chamber whereby the buoyancy of the liquid on the bell is increased with the depth of immersion, and an adjustable counterweight acting on said bell.

8. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, a bell dipping into a liquid and operating said control valve, a connection from an inclosed space vertically on one side of said bell to the offtake main, so that the pressure in such space corresponds to that of the intake side of the exhauster, and an adjustable counterweight acting on said bell.

9. In combination, a fluid-containing chamber, pressure-maintaining means connected to said chamber, a power device for actuating said pressure-maintaining means, a control device for varying the speed at which said pressure-maintaining means is actuated by said power device, a device operated by liquid pressure for operating said control device, a control valve for controlling the supply of liquid under pressure to said device operated by liquid pressure, and a buoyed bell floating in liquid and vertically movable in response to the pressure condition in said chamber for operating said control valve, said device operated by liquid pressure being reversible and operable in either direction by liquid pressure, and said control valve controlling both the supply and discharge of liquid for said device operated by liquid pressure for causing its operation in either direction.

10. In combination, a fluid-containing chamber, pressure-maintaining means connected to said chamber, a power device for actuating said pressure-maintaining means, a control device for varying the speed at which said pressure-maintaining means is actuated by said power device, a device operated by liquid pressure for operating said control device, a control valve for controlling the supply of liquid under pressure to said device operated by liquid pressure, and a buoyed bell floating in liquid and vertically movable in response to the pressure condition in said chamber for operating said control valve.

11. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to either end of said cylinder and permitting the escape of said liquid from the other end of said cylinder, and a fluid-responsive device responsive to the pressure of said oven offtake main for operating said control valve.

12. In combination, a coke oven, an offtake main receiving gas from said coke oven, an exhauster connected to said offtake main, a power device for operating said exhauster, means for controlling the speed at which said exhauster is driven by said power device, a piston and cylinder, the piston being connected to said speed-controlling means, a source of liquid under pressure, a control valve for controlling the admission of liquid under pressure from said source to said cylinder, and a fluid-responsive device responsive to the pressure of said oven offtake main for operating said control valve.

13. In combination, a pump, a control device for varying the speed of said pump, a device operated by liquid pressure for operating said control device, a control valve for controlling the supply of liquid under pressure to said device operated by liquid pressure, and a buoyed bell floating in liquid and vertically movable in response to the pressure at one side of said pump for operating said control valve.

14. In combination, a pump, a control device for varying the speed of said pump, a device operated by liquid pressure for operating said control device, a control valve for controlling the supply of liquid under pressure to said device operated by liquid pressure, and a buoyed bell floating in liquid and vertically movable in response to the pressure at one side of said pump for operating said control valve, said device operated by liquid pressure being reversible and operable in either direction by liquid pressure, and said control valve controlling both the supply and discharge of liquid for said device operated by liquid pressure for causing its operation in either direction.

In witness whereof I have hereunto set my hand at Connersville, Indiana, this 8th day of April, A. D. one thousand nine hundred and sixteen.

JOHN T. WILKIN.